United States Patent [19]

Robello et al.

[11] Patent Number: 5,381,507
[45] Date of Patent: Jan. 10, 1995

[54] OPTICAL ARTICLE CONTAINING A POLYMER THAT EXHIBITS NONLINEAR SECOND ORDER POLARIZATION SUSCEPTIBILITY

[75] Inventors: Douglas R. Robello, Webster; Edward J. Urankar, Ithaca; Craig S. Willand, Pittsford, all of N.Y.

[73] Assignee: Eastman Kodak Company, Rochester, N.Y.

[21] Appl. No.: 154,804

[22] Filed: Nov. 18, 1993

[51] Int. Cl.$^6$ .............................................. G02B 6/16
[52] U.S. Cl. .................... 385/141; 385/122; 385/130; 252/582; 526/243
[58] Field of Search .................. 385/8, 2, 141, 11, 36, 385/122, 130, 143, 129; 372/20, 29; 252/582; 359/266, 284, 276, 315, 245, 280; 264/1.5, 1.1; 526/243; 430/58; 428/220; 427/160; 528/10

[56] References Cited

U.S. PATENT DOCUMENTS

| | | | |
|---|---|---|---|
| 4,792,208 | 12/1988 | Ulman et al. | 385/143 |
| 4,796,971 | 1/1989 | Robello et al. | 385/11 |
| 4,859,876 | 8/1989 | Dirk et al. | 359/245 |
| 4,886,339 | 12/1989 | Scozzafara et al. | 385/141 |
| 4,900,127 | 2/1990 | Robello et al. | 385/141 |
| 4,955,977 | 9/1990 | Dao et al. | 252/582 |
| 5,002,361 | 3/1991 | DeMartino et al. | 252/582 |
| 5,008,043 | 4/1991 | Robello et al. | 252/582 |
| 5,041,509 | 8/1991 | Lee et al. | 252/582 |
| 5,075,043 | 12/1991 | Robello et al. | 252/582 |

OTHER PUBLICATIONS

D. J. Williams, "Organic Polymeric and Non-Polymeric Materials with Large Optical Nonlinearities", *Angew. Chem. Int. Ed. Engl.*, Sep. 1984, vol. 23, pp. 690-703.

J. Zyss, "Nonlinear Organic Materials for Integrated Optics", *Journal of Molecular Electronics*, 1985, vol. 1, pp. 25-45 (no month).

A. Ulman et al., *J. Am. Chem. Soc.*, Sep. 1990, vol. 112, pp. 7083-7090.

Primary Examiner—John D. Lee
Assistant Examiner—Phan Thi Heartney
Attorney, Agent, or Firm—Raymond L. Owens

[57] ABSTRACT

An optical article exhibits effects attributable to the nonlinear second order polarizability of electromagnetic radiation and comprises a polymer containing within its repeating units polar aligned noncentrosymmetric molecular dipoles having an electron donor moiety linked through a conjugated $\pi$ bonding system to an electron acceptor moiety to permit oscillation of the molecular dipoles between a ground state exhibiting a first dipole moment and an excited state exhibiting a different dipole moment, characterized in that the molecular dipoles include as an acceptor moiety a vinyl group geminally substituted by two strong electron withdrawing groups, at least one of which is a perfluoroalkylsulfonyl moiety.

27 Claims, 2 Drawing Sheets

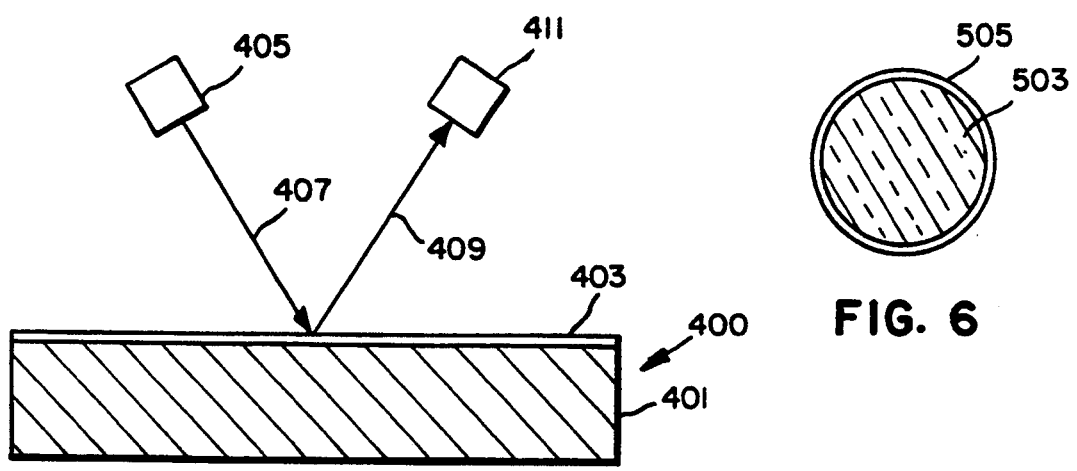
FIG. 4
FIG. 6
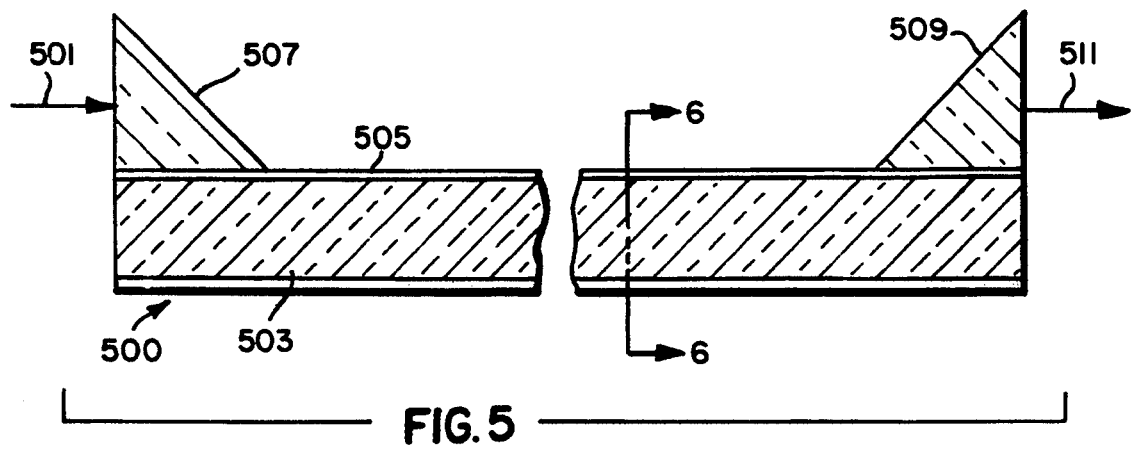
FIG. 5
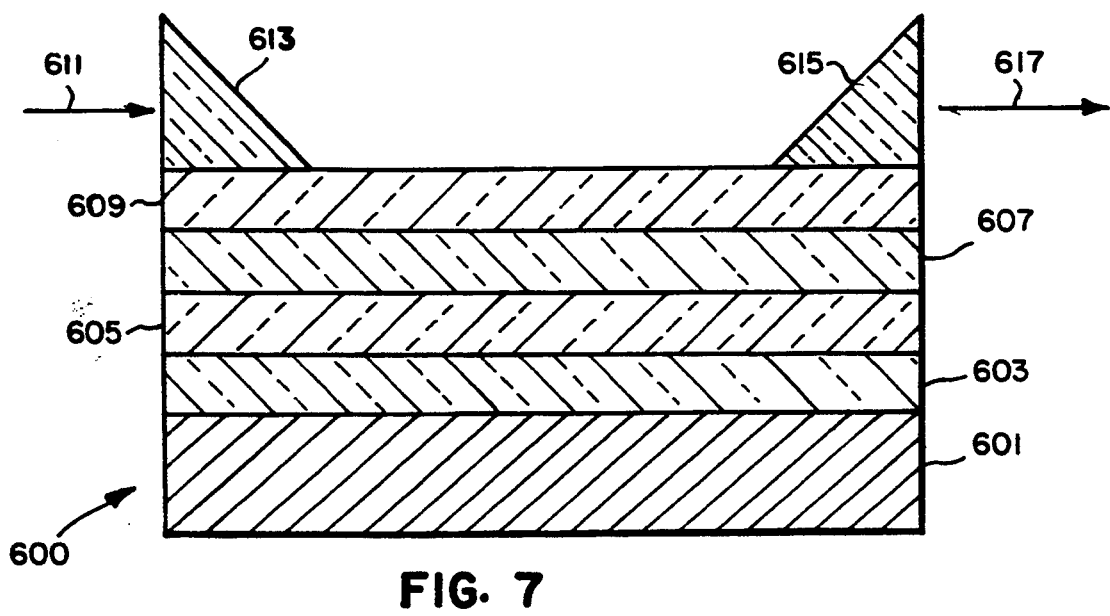
FIG. 7

OPTICAL ARTICLE CONTAINING A POLYMER THAT EXHIBITS NONLINEAR SECOND ORDER POLARIZATION SUSCEPTIBILITY

CROSS REFERENCE TO RELATED APPLICATION

Reference is made to commonly assigned copending application of D. R. Robello et al., Ser. No. 08/154,940, filed Nov. 18, 1993, entitled "Optical Article Containing a Polymer Exhibiting a High Level of Second Order Polarization Susceptibility" now still pending.

FIELD OF THE INVENTION

The invention relates to optical articles that exhibit effects attributable to the polarization of electromagnetic radiation, and more particularly to optical articles that exhibit effects attributable to the nonlinear second order polarizability of electromagnetic radiation.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \ldots \quad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties. $\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \ldots \quad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic radiation, and $\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)}E$, second order or first nonlinear polarization $\chi^{(2)}E^2$, and third order or second nonlinear polarization $\chi^{(3)}E^3$.

To achieve on a macromolecular level second order polarization ($\chi^{(2)}E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu.

A significant difficulty encountered in finding suitable molecular dipoles for second order polarization effects lies in the molecular requirements that must be satisfied to achieve usefully large values of $\beta$. For a molecule to exhibit values of $\beta$ greater than zero, it is necessary that the molecule be asymmetrical about its center, that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment, e.g., the alignment obtained when molecular dipoles are placed in an electric field.

Second order polarization $\chi^{(2)}E^2$ has been suggested to be useful for a variety of purposes, including optical rectification (converting electromagnetic radiation input into a DC output), generation of an electro-optical Pockels effect (using combined electromagnetic radiation and DC inputs to alter during their application the refractive index of the medium), phase alteration of electromagnetic radiation, and parametric effects, most notably frequency doubling, also referred to as second harmonic generation (SHG).

For a number of years the materials employed for achieving second order polarization effects were noncentrosymmetric inorganic crystals, such as potassium dihydrogen phosphate and lithium niobate. Interest in nonlinear optical properties has increased in recent years, driven primarily by the emergence of optical telecommunications, but also stimulated by a broader need to raise optical manipulation capabilities closer to parity with those employed in electronics. This has resulted in an unsatisfied need for higher performance materials.

D. J. Williams, "Organic Polymeric and Non-Polymeric Materials with Large Optical Nonlinearities", *Angew. Chem. Int. Ed. Engl.*, 1984, Vol. 23, pages 690–703, reports second order polarization susceptibilities, $\chi^{(2)}$, achieved with a variety of organic molecular dipoles. The molecular dipoles reported are comprised of an electron acceptor moiety bonded to an electron donor moiety by a linking moiety that provides a conjugated $\pi$ bonding system for electron transfer. Specific electron donor moieties disclosed are dimethylamino, 2- or 4-pyridyl, 2-quinolinyl, and 2-benzothiazolyl. Specific conjugated $\pi$ bonding systems reported are phenylene moieties. Specific electron acceptor moieties disclosed are oxo, cyano, and nitro.

J. Zyss, "Nonlinear Organic Materials for Integrated Optics", *Journal of Molecular Electronics*, 1985, Vol. 1, pages 25–45, discloses a variety of molecular dipole structures for nonlinear optics.

Ulman et al., U.S. Pat. No. 4,792,208, discloses organic molecular dipoles containing sulfonyl moieties as electron acceptors that have high ($>10^{-30}$ esu) second order hyperpolarizabilities ($\beta$) and are capable of being polar aligned to produced films exhibiting high ($>10^{-9}$ esu) second order polarization susceptibilities ($\chi^{(2)}$). In Robello et al., U.S. Pat. No. 5,008,043, the sulfonyl electron acceptor moieties include at least two halogen substituents on their α carbon atoms.

Robello et al., U.S. Pat. No. 4,900,127, discloses a medium exhibiting second order polarization susceptibility that is comprised of a linear vinyl polymer that contains molecular dipoles with sulfonyl electron acceptor moieties as pendant groups. Robello et al., U.S. Pat. No. 5,075,043, discloses a linear condensation polymer in which molecular dipoles containing sulfonyl electron acceptor moieties are oriented to reinforce electron displacement along the polymer backbone.

In Robello et al., U.S. Pat. No. 4,796,971, molecular dipoles forming repeating units in a crosslinked polymeric matrix are disclosed.

Dirk et at, U.S. Pat. No. 4,859,876, discloses an optical device that comprises a second order optically nonlinear element and means for providing optical input to and optical output from the element. The element comprises an organic molecule having second order optical susceptibility in an optically clear glassy polymer.

PROBLEM TO BE SOLVED BY THE INVENTION

Them is a continuing need for polymers that contain dipoles of improved hyperpolarizability and are characterized by high and stable electro-optic coefficient values. The present invention meets these needs.

SUMMARY OF THE INVENTION

In accordance with the present invention, an optical article contains for the transmission of electromagnetic radiation a medium that exhibits a second order polarization susceptibility greater than $10^{-9}$ electrostatic units and comprises a polymer containing within its repeating units polar aligned noncentrosymmetric molecular dipoles having an electron donor moiety linked through a conjugated $\pi$ bonding system to an electron acceptor moiety to permit oscillation of the molecular dipoles between a ground state exhibiting a first dipole moment and an excited state exhibiting a different dipole moment, characterized in that the molecular dipoles include as an electron acceptor moiety a vinyl group geminally substituted by two strong electron withdrawing groups, at least one of which is a perfluoroalkylsulfonyl moiety.

ADVANTAGEOUS EFFECT OF THE INVENTION

The polymers that are included in the medium of high second order polarization susceptibility in optical articles of the invention contain molecular dipoles that are characterized by unexpectedly high values of the ground state dipole moment- molecular optical susceptibility ($\mu.\beta$) product.

BRIEF DESCRIPTION OF THE DRAWINGS

FIG. 4 is an alternative form of a second harmonic generating optical article.

FIG. 5 is an optical article for achieving parametric effects.

FIG. 6 is a section taken along section line 6—6 in FIG. 5.

FIG. 7 is an optical article for achieving parametric effects and phase shifting.

DESCRIPTION OF PREFERRED EMBODIMENTS

Figure 1:
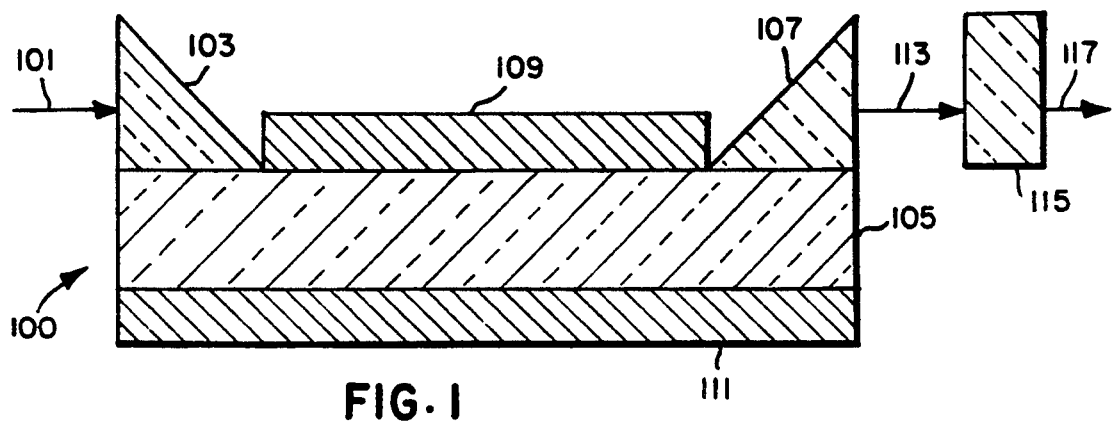
FIG. 1 is a second harmonic generating optical article.

The following are illustrative of optical articles in accordance with the invention that exhibit effects attributable to second order polarization:

Referring to FIG. 1, the optical article 100 is capable of generating a second harmonic of electromagnetic radiation 101 supplied to it. Incoming electromagnetic radiation is introduced through input means 103, shown as a first prism, into an optically active transmission medium 105 that exhibits a high level ($>10^{-9}$ esu) second order or first nonlinear polarization susceptibility, hereinafter referred to simply as the optically active transmission medium according to the invention or, more succinctly, as the optically active transmission medium. Electromagnetic radiation is transmitted through the medium 105 to output means 107, shown as a second prism. In the simplest form of the optical article neither the input nor output prisms are required. Escape of electromagnetic radiation from the transmission medium can be minimized by locating optional cladding elements 109 and 111 above and below the transmission medium. The cladding elements can serve one or a combination of different functions. First, they provide physical protection for the optically active transmission medium. Second, they can be used to control the wavefront distribution of transmitted radiation. When two cladding layers of the same refractive index are shown, a symmetrical wavefront distribution results. When the two cladding layers differ in their refractive indices or one of the two cladding layers, usually the upper cladding layer is absent, an asymmetrical wavefront distribution exists. A third important function provided by cladding layers is to prevent direct contact of the optically active transmission medium with metallic layers, such as electrodes, thereby reducing attenuation of electromagnetic radiation as it is guided longitudinally through the device.

When the transmission medium is constructed according to the requirements of the invention, specifically described below, at least a portion of the electromagnetic radiation entering the transmission medium will be altered in frequency during its travel through the medium. More specifically, a second harmonic of the frequency will be generated. The electromagnetic radiation leaving the output means, indicated by arrow 113, exhibits both the original frequency of the input radiation and a second harmonic of this frequency. Although shown by a single arrow, the different radiation frequencies will exit from the prisms 107 at divergent angles, and this divergence in exit paths can be relied upon for separation of the electromagnetic radiation into its separate wavelength components. Alternatively, the electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters, any broad or narrow frequency band of electromagnetic radiation can be retained in the transmitted output electromagnetic radiation 117.

Figure 2:
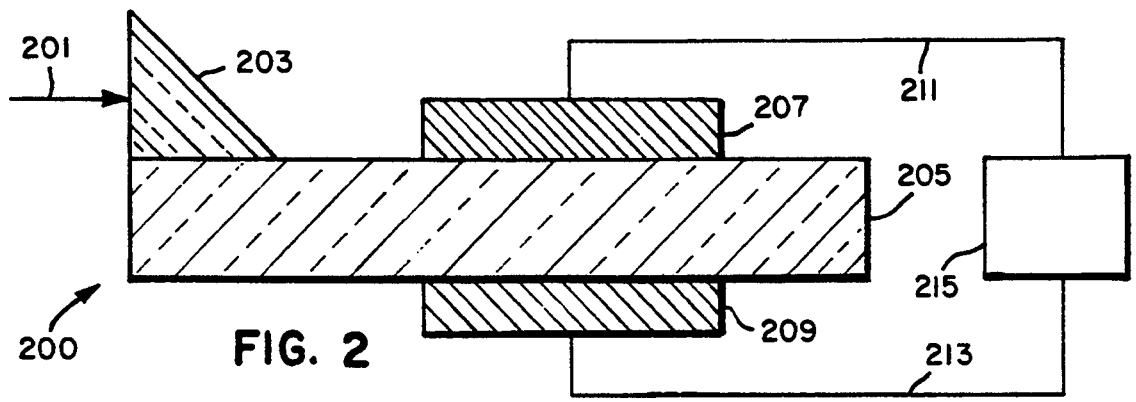
FIG. 2 is a DC signal providing optical article.

Referring to FIG. 2, an optical article 200 is shown capable of producing a DC potential when electromagnetic radiation 201 is supplied through input means 203, shown as a prism, to optically active transmission medium 205, which can be identical to medium 105, described above. When electromagnetic radiation is being transmitted through the medium, a potential difference is produced between upper electrode 207 and lower electrode 209 in electrical contact with the upper and lower surfaces of the transmission medium. Electrical conductors 211 and 213 can be used to relay the potential of the upper and lower electrodes to an electronic response unit 215. The electronic response unit can in its simplest form be a unit that provides a digital response indicative of the presence or absence of electromagnetic radiation in the transmission medium. Alternatively, the electronic response unit can provide an analog response indicative not only of the presence but also the intensity of electromagnetic radiation in the transmission medium.

By modifying the optical article 200 to interpose cladding layers similar to those described above between the electrodes 207 and 209 and the optically active transmission medium, an optical article is created that can be employed as a phase shifter. In this case an electrical potential is supplied from a source 215 through conductors 211 and 213 to electrodes 207 and 209, respectively. Electromagnetic radiation 201 from a beam splitter (not shown) is then fed to the device through the input means 203. The effect of the applied potential gradient on the electromagnetic radiation being guided through the optically active transmission medium is to cause light emerging from the optically active medium to be phase shifted as compared to a second portion of the electromagnetic radiation supplied from the beam splitter and guided through a transparent optically passive medium.

Figure 3:
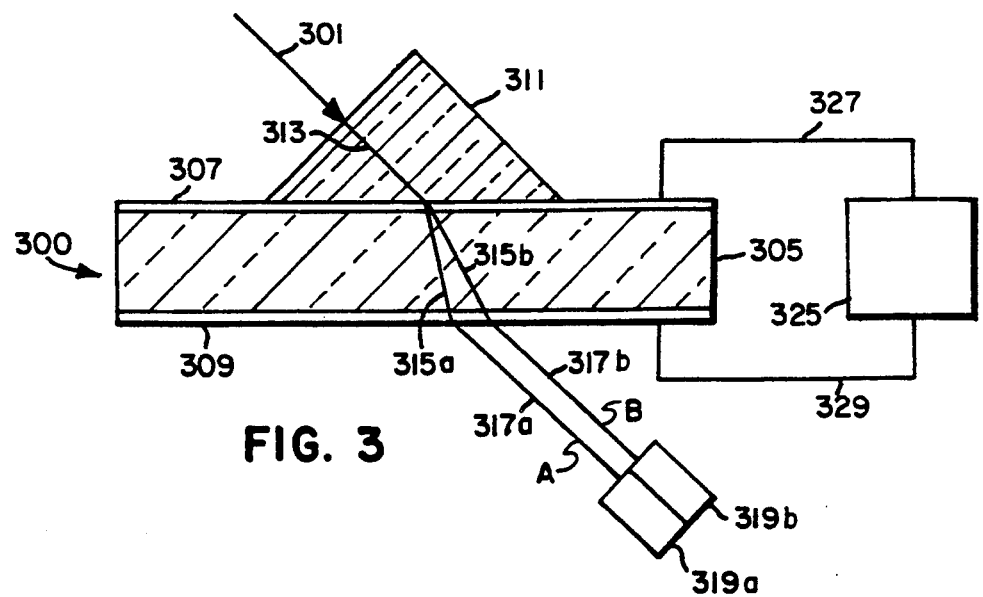
FIG. 3 is an electromagnetic beam displacement optical article.

Referring to FIG. 3, the optical article 300 is capable of physically displacing a beam 301 of electromagnetic radiation being transmitted through it as a function of the concurrent receipt of a DC bias. Optically active transmission medium 305, which can be identical to optically active medium 105 or 205, is provided with transparent upper and lower electrodes 307 and 309. The electrodes can, from example, be thin layers of a vacuum vapor deposited metal or metal oxide, e.g., indium tin oxide. An electromagnetic radiation input means, shown as prism 311, is located on the upper transparent electrode. The electromagnetic radiation passes through the prism as indicated by arrow 313. When the electromagnetic radiation enters the transmission medium, it follows either path 315a or path 315b. Depending upon which of the two alternative paths are followed, the first electromagnetic radiation either travels along path 317a or 317b upon emerging from the lower transparent electrode. The paths 315a and 317a together constitute an A path through the optical article while the paths 315b and 317b together constitute a B path through the optical article. Sensing units 319a and 319b are located to receive electromagnetic radiation traveling along the A and B paths, respectively. It is apparent that only one of the two sensing units is essential, since failure to sense electromagnetic radiation can be employed to indicate that the electromagnetic radiation has shifted to the alternative path.

Shifting of electromagnetic radiation between the A and B paths is achieved by supplying a DC bias to the upper and lower electrodes while transmission of the electromagnetic radiation through the optically active transmission medium is occurring. To accomplish the required DC bias, a DC potential source 325 is shown connected to the upper and lower electrodes by electrical conductors 327 and 329.

Application of the DC bias alters the refractive index of the transmission medium when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability $\beta$.

In FIG. 4 an optical article 400 is shown comprised of a reflective substrate 401 and an optically active transmission medium 403 according to the invention shown in the form of a layer. Electromagnetic radiation is supplied from a source 405 as indicated by arrow 407. The electromagnetic radiation traverses the optically active transmission medium, is reflected by the substrate, and traverses the optically active transmission medium a second time. Electromagnetic radiation leaving the optically active transmission medium is indicated by arrow 409. A sensor 411 which is responsive to the second harmonic of the input electromagnetic radiation but not to radiation at the wavelength of the input radiation is provided to receive electromagnetic radiation from the layer 403. Instead of employing a sensor that is selectively responsive to the second harmonic wavelength, separation of the fundamental and second harmonic wavelengths can be undertaken as described above in connection with FIG. 1. The thinner the layer of the optically active transmission medium, the higher the intensity of the input electromagnetic radiation must be in order to achieve a given output of second harmonic radiation. In the limiting case the optically active transmission medium can be a monomolecular oriented molecular dipole layer.

In FIGS. 5 and 6 an optical article 500 according to the invention is shown that is capable of inducing parametric effects, such as second harmonic generation, by acting on input electromagnetic radiation, indicated by arrow 501. To achieve alteration of the input radiation, a transparent optical waveguide 503 of any conventional type is provided having on its external surface a layer of an optically active transmission medium 505, which can have the same properties as the medium 105, described above. The optical waveguide 503 is normally optically passive, that is, it exhibits no significant levels of nonlinear (second or third order) polarization. Concentrically surrounding the optically active transmission medium 505 is a cladding layer 507. The waveguide 503 and the cladding layer 507 each have a lower refractive index than the optically active transmission medium 505.

As the input electromagnetic radiation 501 traverses the waveguide 503, a portion of the radiation will impinge on the surrounding layer of the optically active transmission medium 505 and be refracted back into the waveguide. Successive impingements of transmitted radiation on the optically active medium result in measurable parametric effects, such as second harmonic generation. The cladding layer 507 performs the function of the cladding layers described in FIG. 1. The output radiation 511 is transmitted through the prism 509.

In FIG. 7 an optical article 600 is shown capable of producing useful parametric effects similarly as optical article 500, but exhibiting a greater capability for better phase matching, such as that desired for more efficient second harmonic generation. A substrate 601 is shown supporting superimposed waveguide layers 603, 605, 607 and 609. While four superimposed layers are shown, in practice any odd or even number of superimposed layers can be provided. The odd layers (603 and 607) in the sequence can be formed of an optically active transmission medium according to the invention (similarly as medium 105), while the even layers (605 and 609) can be formed of a passive or linear optical medium, as described above. Alternatively, the optically active and passive transmission media layers can be reversed in order. In either instance, but particularly in the latter, an optional cladding layer similar to cladding layers of FIG. 1 can be provided.

To achieve useful parametric effects, electromagnetic radiation indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric, e.g., second harmonic, effects are more efficiently generated.

The optical article constructions described above are exemplary of a large variety of possible differing optical article constructions. The present invention is compatible with any conventional construction of an optical article relaying on a significant second order polarization susceptibility to produce a useful effect. For example, whereas in connection with FIG. 5 an optical article is disclosed in which the optically active transmission medium surrounds a substrate that can have linear optical properties, Zyss, cited above, discloses in FIG. 2(d) just the converse arrangement, in which the optically active transmission medium forms a core clad with a shell of a linear optical transmission medium. Zyss also discloses an arrangement in which the optically active transmission medium is located in a groove on the surface of a linear optical transmission substrate. All of the optical article constructions of Zyss exhibiting second order nonpolarization effects can be applied to the practice of this invention and are incorporated herein by reference.

An essential component of each of the optical articles of the this invention is an optically active transmission medium comprised of a polymer that exhibits a second order polarization susceptibility $\chi^{(2)}$ greater than $10^{-9}$ esu, preferably greater than $10^{-8}$ esu. The polymer can be a linear polymer obtained by vinyl addition polymerization and incorporating molecular dipoles as pendant groups, as disclosed in the previously mentioned U.S. Pat. No. 4,900,127; a crosslinked polymer matrix that includes molecular dipole repeating units, as disclosed in the previously mentioned U.S. Pat. No. 4,796,971; or a linear condensation polymer in which molecular dipoles are included in the polymer backbone and oriented to reinforce electron displacement, as disclosed in the previously mentioned U.S. Pat. No. 5,075,043; the disclosures of these patents are incorporated herein by reference.

The high $\beta$ molecular dipole MD along with the connector moieties L by which it is incorporated in the structure of a polymer of the invention can be represented by the following formula pair:

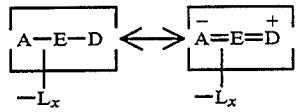

where

A is an electron acceptor moiety;

D is an electron donor moiety;

E is a conjugated $\pi$ bonding system consisting of two terminal carbocyclic aromatic rings linked by 2 to 6 atoms that comprise vinylene, azomethine, or azo groups; and L is a connector moiety; and x is an integer from 1 to 4.

The molecular dipoles are represented by the oscillation (resonance) ground state and excited state extremes, since these lend themselves to representation by chemical formulas. Formula pairs are useful in bracketing the range of structural variance, even though it is recognized that in practice neither of the oscillation extremes may be actually fully realized. As is customary because of the simpler chemical nomenclature, the molecular dipoles and their moieties are named by their ground state structures.

The electron donor moiety D can take any convenient conventional form. For example, the electron donor moiety can be a primary, second, or tertiary amino moiety, tertiary amino being most preferred and primary amino being least preferred. Only secondary and tertiary amino moieties allow for substituent modification of properties through optional substitution of a hydrocarbon moiety, and only the tertiary amino moiety produces the most highly polar excited state.

Instead of employing an amino group as an electron donor moiety, it is specifically contemplated to employ oxy or thio electron donor moieties, for example, substituted or unsubstituted alkoxy or alkylthio moieties. The number of atoms in the resonance path between the electron donor and acceptor is an even number and is preferably at least 4 and optimally at least 8.

The conjugated $\pi$ bonding system E linking the electron acceptor and donor moieties is selected to satisfy three fundamental characteristics. First, it is chosen so that the molecule will be noncentrosymmetric, thereby exhibiting a dipole moment even in its ground state. Second, it is chosen to provide sufficient spatial separation of the electron donor and acceptor moieties to provide a large dipole moment in the polar excited state of the electron donor and acceptor moieties. Third, it is chosen to permit efficient oscillation or charge transfer resonance between the ground and excited states. This results in large differences between the excited state and ground state dipole moments.

While increasing the number of atoms in the resonance path should increase the excited state dipole moment, it also tends toward nonplanar molecular conformations which lead to losses in hyperpolarizability density as well as thermal and other energy losses (e.g., losses in transparency), so that at first diminishing gains and then overall losses result from increasing the number of atoms in the resonance path. It is generally preferred that the number of atoms in the resonance path between the electron donor and acceptor be 20 or less and optimally 14 or less.

In a preferred form, the conjugated π bonding system E can be represented by the following formula pair:

where
G is independently in each occurrence methine or aza, and
m is 10 to 16.

For synthetic convenience it is generally preferred that no more than two adjacent G groups be aza groups. Thus, both individual aza (-N=) and diazo (-N=N-) groups are contemplated to be present in the conjugated π bonding system.

While the aza groups permit no substitution, the methine groups can be substituted, if desired. Preferred conjugated π bonding systems are those which have been at least partially rigidized by substituents bridging methine groups in the resonance path. Rigidization of the π bonding system reduces energy dissipation. In a specifically preferred form of bridging substitution of the methine groups in the resonance path, the conjugated π bonding system is wholly or, preferably, partially aromatized. Both carbocyclic and heterocyclic aromatization is specifically contemplated.

The electron acceptor moiety A and the adjacent terminal portion of the π bonding system can be represented by the following formula pair:

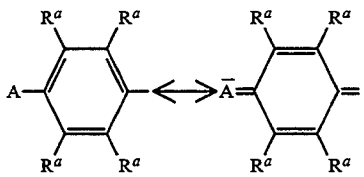

where
A is an electron acceptor moiety, and
$R^a$ represent hydrogen, substituents which together with the electron acceptor moiety collectively enhance the electron acceptance of the phenyl ring to which they are attached, or, optionally in one occurrence, a connector moiety L.

The electron donor moiety D and the adjacent terminal portion of the π bonding system can be represented by the following formula pair:

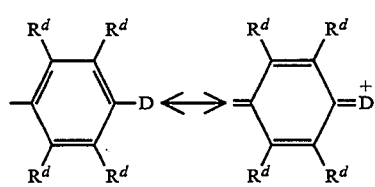

where

D is an electron donor moiety, and
$R^d$ represent hydrogen, substituents which together with the electron donor D collectively enhance the electron donation of the phenyl ring to which they are attached, optionally including substituents such as hydrocarbon substituents or, optionally in one occurrence, a connector moiety L.

When the electron donation is from a nitrogen atom, a terminal aromatic rigidizing ring system formed by a 4-pyridinium and 4-pyrido tautomer is possible, as illustrated by the preferred dipolar compounds of the following formula pair:

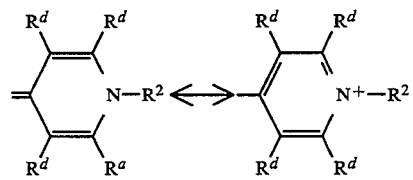

where
$R^d$ is as previously defined and $R^2$ is L, hydrogen, or an optionally substituted hydrocarbon moiety.

In specifically preferred forms of the molecular dipoles, the conjugated π bonding system is aromatized adjacent to the electron acceptor moiety and the electron donor moiety.

A specifically preferred class of molecular dipoles satisfying the requirements of the invention are 4-A-4'-D-stilbenes, where A and D are as previously defined. In these stilbenes the electron acceptor and donor moieties are each bonded to one terminal aromatized portion of the conjugated π bonding system, with the aromatized portions of the π bonding system being joined by a vinylene group. When the single vinylene linking group of the stilbene is replaced by two or more vinylene groups within the resonance path chain length limits noted above, highly advantageous analogues are realized. Replacement of individual methine groups of the vinylene groups by nitrogen (aza group) is compatible with achieving high β values. The vinylenically extended and aza substituted stilbene variants are hereinafter referred to as stilbenoid compounds, since they are compounds which share significant property similarities with stilbenes.

In a preferred form of the invention, the stilbenoid compounds can be represented by the following formula pair:

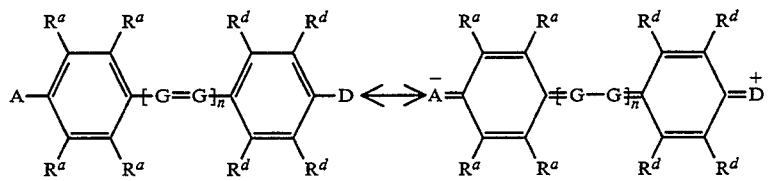

where
A, D, $R^a$, and $R^d$ are as previously defined,
G is independently in each occurrence a methine or aza group with the proviso that no more than two aza moieties are next adjacent, and n is an integer of from 1 to 3.

When the conjugated π bonding system contains two or more aromatic tings, it is specifically preferred that they be coplanar, since coplanarity achieves the highest hyperpolarizability densities. To preserve the coplanarity of the rings it is preferred that any intermediate methine groups which are not part of an aromatic ring remain unsubstituted. However, sterically compact methine substituents compatible with coplanarity, such as fluorine and lower alkyl groups of from about 1 to 3 carbon atoms, are contemplated.

In accordance with the present invention, the electron acceptor moiety A is a vinyl group geminally substituted on the terminal carbon atom by two strong electron withdrawing groups, at least one of which is a perfluoroalkylsulfonyl moiety; A can be represented by the following formula:

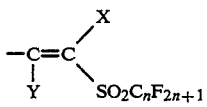

where
X is a strong electron withdrawing group,
Y is hydrogen or, optionally, a strong electron withdrawing group that is the same as or different from X, and
n is an integer from 1 to about 10.

value; if it is electron donating, causing the benzene ring to be electron donating, it has a negative $\sigma_p$ value.

Weak electron withdrawing substituents have small positive values of $\sigma_p$; strong electron withdrawing groups have larger positive values for $\sigma_p$, +0.5 or greater. Similarly, weak electron donating substituents have small negative $\sigma_p$ values; strong electron donating substituents have larger negative values of $\sigma_p$. The $\sigma_p$ value for hydrogen is zero. The derivation and utilization of Hammett sigma constants is described in G. March, *Advanced Organic Chemistry*, Second Edition, 1977, McGraw-Hill, New York, pages 251–254. *Lange's Handbook of Chemistry*, 12th Edition, 1979, McGraw-Hill, New York, Table 3-12, pages 3-134 to 3-137, lists Hammett sigma values for a large number of substituents. In accordance with the invention, X moieties and, optionally, Y moieties are selected from the group consisting of -COR, -COOR, -CN, -SO₂R, SO₂C$_n$F$_{2n+1}$, and -NO₂, where R is an optionally substituted hydrocarbon moiety and n is as previously defined. Preferably, X is -CN or SO₂C$_n$F$_{2n+1}$ and Y is hydrogen or -CN. In Table 1 are listed molecular dipole compounds containing electron acceptor moieties in accordance with the invention.

TABLE 1

Molecular Dipole Compounds Containing Electron Acceptor Moieties of the Invention (1) (C₄H₉)₂N—⟨benzene⟩—N=N—⟨benzene⟩—CH=C(SO₂CF₃)(SO₂CF₃)

(2) (C₄H₉)₂N—⟨benzene⟩—N=N—⟨benzene⟩—CH=C(CN)(SO₂C₄F₉)

(3) C₄H₉N(with propyl)—⟨benzene⟩—N=N—⟨benzene⟩—CH=C(CN)(SO₂C₄F₉)

(4) [HO(CH₂)₆]₂N—⟨benzene⟩—N=N—⟨benzene⟩—CH=C(CN)(SO₂C₄F₉)

(5) HO(CH₂)₆N(CH₃)—⟨benzene⟩—N=N—⟨benzene⟩—CH=C(SO₂CH₂CH₂COOC₂H₅)(SO₂C₄F₉)

(6) C₂H₅OOCCH₂N(CH₃)—⟨benzene⟩—N=N—⟨benzene⟩—CH=C(SO₂(CH₂)₆OH)(SO₂CF₃)

For the invention, strong electron withdrawing groups suitable as X moieties and optionally as Y moieties are those groups which have Hammett sigma para ($\sigma_p$) values equal to or greater than about 0.5. Hammett sigma values constitute a measure of the electrical effects of substituents attached to a benzene ring. If a substituent is electron withdrawing, causing the benzene ring to be electron accepting, it has a positive $\sigma_p$ Where the electron donor and/or electron acceptor moieties are relied upon for linking of the molecular dipoles to the polymer backbone, the aromatic rings of the conjugated $\pi$ bonding system can be left unsubstituted while achieving high levels of performance. In other instances it may be synthetically convenient to employ the aromatic rings of the linking moiety as sites for linking the molecular dipoles to the polymer backbone. In either instance, it is appreciated that the dipole moment of a molecular dipole can be increased by employing in available phenylene ring positions substituents which supplement the electronic asymmetry induced by the electron acceptor A moiety and the electron donor moiety D.

As previously discussed, substituents which render phenyl rings electron accepting are assigned positive Hammett sigma values, while negative Hammett sigma values are assigned to substituents which render phenyl rings electron donating. By algebraically summing the Hammett sigma values of substituents to a phenyl ting, it is possible to arrive at a net Hammett sigma value for the phenyl ring that is indicative of whether the substituted phenyl ring is electron accepting (indicated by a positive net Hammett sigma value) or electron donating (indicated by a negative net Hammett sigma value). Furthermore, the algebraic sum of the substituent Hammett sigma values quantifies the degree to which the substituted phenyl ring is electron accepting or donating. Although it is preferred to select $R^a$ substituents independently from among known phenyl ring substituents having a positive Hammett sigma value and to select $R^d$ substituents independently from among known phenyl ring substituents having a negative Hammett sigma value, it is recognized that useful combinations of $R^a$ and $R^d$ substituents are possible in which some are electron donating, some are neutral, and some are electron accepting.

It is also recognized that two adjacent $R^a$ or $R^d$ substituents can, if desired, together form a ring fused with the phenyl ring to which they are attached. Fused benzo rings are specifically contemplated. Polycyclic aromatic rings, such as naphthyl and anthracyl aromatic rings, in the conjugated $\pi$ bonding system are therefore possible. Fused benzo rings are compatible with the coplanarity of the aromatic nuclei and, unless they are themselves substituted, have little effect on electronic asymmetry. It is further recognized that substituents attached to the nitrogen, oxygen, or sulfur atoms of an electron donor moiety D can, if desired, form with an $R^d$ substituent ortho to D a fused ring, preferably a 5- or 6-membered ring. For example, an amino electron donor moiety can form a julolidine ring with an adjacent $R^d$ moiety. Numerous other fused rings containing the heteroatom of the electron donor moiety are possible. However, while within the contemplation of useful dipole molecular structures, fused ring substituent patterns are not generally preferred, since they increase molecular bulk, thereby reducing the hyperpolarizability density, while lacking in many instances the synthetic convenience of monovalent substituents.

Specifically contemplated forms of hydrocarbon substituents that can be present in the electron donor D and electron acceptor A moieties are aliphatic hydrocarbon substituents containing from 1 to about 40 (preferably 1 to 10 carbon atoms and optimally 1 to 6) carbon atoms, e.g., alkyl, alkenyl, and alkynyl, including all cyclic forms thereof; aromatic hydrocarbon substituents containing from 6 to 20 carbon atoms (preferably 6 to 10 carbon atoms-i.e., phenyl and naphthyl); and hydrocarbon substituents which are composites of these aliphatic and aromatic substituents, e.g., alkaryl, aralkyl, alkaralkyl, aralkaryl, etc. The aliphatic substituents and substituent moieties can contain unsaturation for steric or synthetic convenience. All of the hydrocarbon substituents can, optionally, themselves be substituted to facilitate polar alignment in the transmission medium.

As previously described, a polymer of the invention can be a crosslinked polymer matrix that includes molecular dipole repeating units, as in U.S. Pat. No. 4,796,971, the disclosures of which are incorporated herein by reference.

For the molecular dipoles to form a crosslinked polymer matrix, it is necessary that they be linked in polar alignment to at least three adjacent molecular dipoles. For this to be achieved, each molecular dipole requires at least one connector moiety L, which serves as a crosslinking moiety. Where a single crosslinking moiety is provided for each molecular dipole, the crosslinking moiety must itself be capable of linking at least three adjacent molecular dipoles in order to form a crosslinked polymeric matrix. A siloxy ($-SiO_3$) group is an example of a preferred moiety capable of crosslinking three adjacent molecular dipoles through oxy (-O-) linkages. By providing two or more crosslinking moieties, the molecular dipoles join in forming two or more polymeric backbones and hence a crosslinked polymeric matrix.

To form siloxy ($-SiO_3$) crosslinking groups by reaction with, for example, a silicon trichloride ($-SiCl_3$) compound, the molecular dipole preferably contains at least hydroxy functional group in the crosslinking moiety. Alternatively, the molecular dipoles can contain precursor groups, esters for example, that can be converted to hydroxy functional groups. The hydroxy groups or their precursors can be located in the electron acceptor moiety, the electron donor moiety, or the conjugated $\pi$ bonding system of the molecular dipole. Compound (4) in Table 1 illustrates a hydroxysubstituted molecular dipole compound useful for incorporation into a polymeric matrix in accordance with the invention.

Another approach for achieving a polymeric matrix as contemplated in the present invention is to employ monomeric molecular dispole compounds containing two or more photopolymerizable substituent groups. Flexible linkage are required in the molecule so that the photopolymerizable substituent groups are allowed freedom of orientation while the molecular dipole remains in polar alignment with the externally applied electric field. Thus, a connector moiety L suitable for photocrosslinking preferably comprises an activated vinyl group and a flexible alkylene group containing 1 to 12 carbon atoms, preferably about 4 to 8 carbon atoms. The connector moieties L, which serve as photocrosslinking moieties preferably contain acrylate or methacrylate groups. Since each molecular dipole contains at least two photocrosslinking moieties, a rigid crosslinked polymeric matrix is created by photopolymerization.

A polymer of the present invention can also be a linear condensation polymer in which the molecular dispoles are included in the polymer backbone and oriented to reinforce electron displacement along the polymer backbone, as disclosed in the previously mentioned U.S. Pat. No. 5,075,043, the disclosures of which are incorporated herein by reference.

Linear condensation polymers in accordance with the present invention require monomeric molecular dipole compounds containing two individual interactive functional groups capable of selective condensation reaction with each other. Because the molecular dipoles are to be incorporated in the condensation polymers backbone to reinforce electron displacement, two individual connector moieties L containing the interactive functional groups are included in the electron donor moiety and electron acceptor moiety, respectively, or the molecular dipole. The functional groups in the connector moieties attached to the electron donor moieties cannot react with one another. Similarly, the functional groups in the connector moieties attached to the electron acceptor moieties cannot react with one another. This ensures that there is no possibility of some molecular dipoles being incorporated in the polymer backbone in a reversed orientation, which would tend to diminish rather than increase $\chi^{(2)}$.

In accordance with the present invention, preferred classes of linear condensation polymers containing molecular dipoles in their backbones are polyesters, polyamides, polyurethanes, and polyamines. Polyesters are particularly preferred. To prepare polyesters of the invention, one of the interactive functional groups is a hydroxy functional group or its reactive equivalent, and the other is a carboxy functional group or its reactive equivalent. The hydroxy group or its reactive equivalent can be contained in the connector moiety attached to the electron donor moiety, and the carboxy group or its reactive equivalent can be included in the connector moiety attached to the electron acceptor moiety, or vice versa.

For the formation of condensation polyesters, reactive equivalents of carboxy groups include carbonyl halides, mixed acids anhydrides, or carboxylic esters derived from volatile, low molecular weight alcohols. Reactive equivalents of hydroxy groups include esters derived from volatile, low molecular weight carboxylic acids. Compounds (5) and (6) in Table 1 illustrate molecular dipole compounds useful for incorporation into a linear polyester condensation polymer in accordance with the invention.

A preferred form of the polymer is a linear polymer obtained by vinyl addition polymerization in which the repeating units contain molecular dipoles as pendant groups, as represented by the following formula:

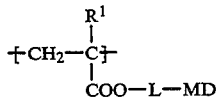

where
  L is a divalent flexible spacer moiety,
  MD is a molecular dipole exhibiting first hyperpolarizability $\beta$ greater than $10^{-30}$ esu, and
  $R^1$ is hydrogen, halogen, or alkyl of from 1 to 6 carbon atoms. Polymers in which repeating units contain pendant molecular dipoles are disclosed in the previously mentioned U.S. Pat. No. 4,900,127, the disclosures of which are incorporated herein by reference.

It is apparent that when $R^1$ is hydrogen or methyl the repeating unit is derived from an acrylate or methacrylate ester, respectively. These are the most common alkenoic acid esters employed in vinyl addition polymerization, but a variety of variants are known and can be employed alternatively, if desired. The acrylate and methacrylate esters are advantageous in offering the least molecular bulk.

To achieve a high level of $\chi^{(2)}$, it is preferred that at least 5 percent of the repeating units of the polymer contain as pendant groups molecular dipoles exhibiting first hyperpolarizability $\beta$ greater than $10^{-30}$ esu, hereinafter referred to as high $\beta$ molecular dipoles. When the repeating units containing high $\beta$ molecular dipoles constitute at least 5 percent of the total repeating units of the linear polymer, they generally constitute about 20 percent, on a weight basis, of the linear polymer, since they typically exhibit a relatively higher molecular weight than the remaining repeating units, if any, of the linear polymer.

To allow the molecular dipole freedom of spatial orientation with respect to the polymer backbone, as is required for efficient poling, a divalent flexible spacer L is interposed between the polymer backbone and the molecular dipole. A generally preferred flexible spacer is an alkylene group containing 1 to about 12 carbon atoms. In a variant form one or several nonadjacent carbon atoms can be replaced by oxygen, so that the linkage becomes an alkylene oxide linkage, e.g., an ethylene oxide linkage. Such a flexible spacer moiety can be readily provided by esterifying with the alkenoic acid a molecular dipole which contains a terminally hydroxy substituted alkyl or alkylene oxide substituent.

In one preferred form of the invention the repeating units containing molecular dipole pendant groups of the linear polymers exhibiting high $\chi^{(2)}$ values can be represented by the following formula pair:

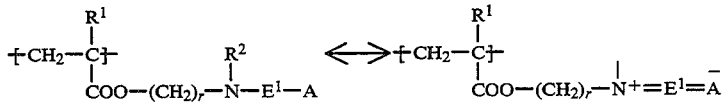

where
  A is an electron acceptor,
  $E^1$ is a 4,4'-stilbenoid moiety,
  r is an integer of from 1 to 12,
  $R^2$ is hydrogen or a hydrocarbon containing from 1 to 6 carbon atoms, and
  $R^1$ is hydrogen or methyl.

The linear polymers containing repeating units with pendant molecular dipoles as described above can, if desired, contain only repeating units with pendant molecular dipoles. The same or different pendant molecular dipoles can be present in the repeating units. In the former instance, the linear polymers are homopolymers. When all of the repeating units contain a pendant molecular dipole, the highest attainable polarization susceptibilities should be obtained.

One disadvantage that has been encountered in preparing homopolymers satisfying the requirements of the invention is limited solubility. This is believed to result from a small amount of unwanted addition occurring at the sites of the vinyl moieties in the pendant groups. The homopolymers, despite their stiffness, can be shaped into useful optically active transmission media by hot pressing and poling.

To allow solubility of the linear polymers in common organic solvents (e.g., benzene, chlorobenzene, toluene, dimethylformamide, dimethylsulfoxide, chloroform, dichloromethine, acetonitrile, and acetone) and thus to allow spin casting of the linear polymers, it is preferred to limit the proportion of the repeating units containing vinyl groups to 35 percent or less of the total repeating units. Thus, in one preferred linear polymers contemplated for use in the practice of this invention are those containing from 5 to 35 percent (optimally 20 to 35 percent) repeating units containing molecular dipoles containing vinyl unsaturation (e.g., stilbene molecular dipoles). High $\chi^{(2)}$ values can be achieved even when the high $\beta$ repeating units constitute only 5 percent of the total repeating units of the linear polymers.

In another preferred form of the invention, vinyl groups in the repeating units of the linear polymers are avoided entirely, thereby entirely avoiding the problem of limited solubility. This can be accomplished while still retaining high $\beta$ repeating units by employing pendant molecular dipoles according to the invention which contain a pair of aza groups rather than one or more vinyl groups e.g., azobenzene ($-C_6H_4-N=N-C_6H_4-$) molecular dipoles.

The remaining repeating units of the linear polymer can be provided by vinyl addition monomers chosen from among a wide variety of conventional forms. In one form the remaining repeating units can also include pendant molecular dipoles. To avoid unwanted addition reactions in the pendant molecular dipoles during polymerization, the pendant groups of the remaining repeating units should be free of vinyl moieties. For example, the pendant molecular dipoles in the remaining repeating units can be identical to the high $\beta$ repeating units described above, except that the 4,4'-stilbenoid linking is replaced by a 1,4-phenylene or 4,4'-biphenylene linking moiety.

Any remaining repeating units other than those containing molecular dipole pendant groups can, but need not, contain a pendant group. In one preferred form of the invention the remaining repeating units are chosen from among esters and nitriles of 2-alkenoic acids. Preferred repeating units of this type can be represented by the following formula:

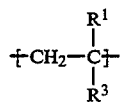

where
R$^1$ is as has been previously defined, preferably hydrogen or methyl,
R$^3$ is -CN or -COOR$^4$, and
R$^4$ is an optionally substituted hydrocarbon, preferably alkyl of from 1 to 6 carbon atoms.

Methyl and ethyl acrylates and methacrylates, acrylonitrile, and methacrylonitrile are specifically preferred examples of these repeating units.

Any one or a combination of the repeating units described above can, with the high $\beta$ repeating units, account for all of the repeating units of the linear polymers employed in the optical articles of this invention. However, no repeating units other than the high $\beta$ repeating units are required.

To form the polymers described above, it is merely necessary to combine in the proportions desired in the linear polymer vinyl addition monomers corresponding to the repeating units. Polymerization can be induced thermally or by exposure to ultraviolet radiation (UV). For polymerization in the near UV (290 to 390 nm) portion of the spectrum as well as the shorter wavelength (less than 550 nm) regions of the visible spectrum conventional polymerization initiators can be employed. A variety of conventional useful polymerization initiators are listed in Scozzafava et al,. U.S. Pat. No. 4,485,161 and in G. Odiah, *Principles of Polymerization*, 2nd Ed., 1981, John Wiley & Sons, New York, pages 194–206.

The optically active transmission medium need contain nothing in addition to the linear polymer described above. In practice small amounts of polymerization initiators, usually less than 1 percent by weight, based on the weight of polymer, can remain in the polymer when it is formed into the optically active transmission medium. Because of their low concentrations, absorption of radiation by residual initiators are normally too low to be significant. It is also possible, though not usually preferred, to combine the high $\chi^{(2)}$ linear polymers described with other binders, such as optically passive linear polymers, in forming the transmission medium. Other binders can be tolerated to the extent that $\chi^{(2)}$ for the transmission medium remains above $10^{-9}$ esu. Molecular dipoles which are not pendant groups of a polymer can be mixed with the high $\chi^{(2)}$ linear polymers, if desired, but this is not required, since better control of the properties of the transmission medium is achieved when the molecular dipoles are pendant groups of a linear polymer.

To facilitate polar alignment of the molecular dipoles contained within the optically active transmission medium the high $\chi^{(2)}$ linear polymers (and other binders, if present) must exhibit glass transition temperatures above ambient temperatures. To assure that the transmission medium is sufficiently rigid to lock the molecular dipoles in polar alignment under temperatures of use, it is preferred that the high $\chi^{(2)}$ linear polymers exhibit a glass transition temperature in the range of from about 70° C. to 180° C. Linear polymers having still higher glass transition temperatures can be employed, but are not preferred because of the high temperatures required for poling and the resulting potential for thermal degradation of the organic components of the optical transmission medium.

In accordance with the invention, the high $\beta$ linear polymers preferably have molecular weights (weight average, also designated $M_w$) in the range of from about 10,000 to 400,000, more preferably from about 40,000 to 200,000. Polymer molecular weights were measured by size exclusion chromatography, usually with polymethyl methacrylate calibration. The high $\beta$ polymers preferably have glass transition temperatures, $T_g$, in the range of from about 90° to 190° C., more preferably from about 110° to 170° C. Glass transition temperatures were determined by differential scanning calorimetry.

The specific selection of materials forming the optically active transmission media will be influenced by the wavelengths of electromagnetic radiation to be propagated. The preferred optical articles of this invention are those which exhibit the lowest possible absorptions of electromagnetic radiation in the optically active transmission medium. For optical articles that are intended to propagate a single wavelength or range of wavelengths of electromagnetic radiation, transmission media are employed which exhibit absorption minimal within the wavelength region of propagation. Where the optical article itself receives electromagnetic radiation of one wavelength and internally produces for transmission electromagnetic radiation of a differing wavelength, the transmission medium is preferably chosen to exhibit minimal absorptions in both spectral regions. For example, if it is intended to employ an optical article according to this invention for second harmonic generation in response to infrared radiation received from a laser, such as a laser emitting in the 800 to 1600 nm region of the spectrum, the linear polymers are chosen to exhibit the lowest levels of absorption possible at the laser wavelength in the infrared and at the wavelength of the second harmonic in the visible spectrum.

The following examples further illustrate the invention.

EXAMPLE 1

Preparation of 4-Dibutylamino-4'-($\beta$, $\beta$-bis(trifluoromethylsulfonylvinyl)azobenzene (1)

A mixture of 210 mg (0.75 mmol) of bis(trifluoromethylsulfonyl) methane, 200 mg (0.6 mmol) of 4-dibutylaminoazobenzene-4'-carboxaldehyde (prepared as described in Example 2 below), and 10 mL of isopropyl alcohol was stirred at 23° C. for 72 hr. The solvent was evaporated and the residue was dissolved in dichloromethane. After washing with water and drying over $Na_2SO_4$, the solution was concentrated at reduced pressure to afford 150 mg of (1) as a purple solid. FD-MS 599 m/e (M+).

EXAMPLE 2

Preparation of 4-Dibutylamino-4'-($\beta$-cyano-$\beta$-perfluorobutylsulfonylvinyl)azobenzene (2)

A. 4-Dibutylaminoazobenzene-4'-carboxaldehyde. A suspension of 100 g (0.84 mol) of 4-aminobenzaldehyde ("monomer", obtained from TCI American Organic Chemicals) in 300 mL of concentrated hydrochloric acid and 1200 mL of water was stirred mechanically for 1 hr. The suspension was cooled to 0° C., and a solution of 58 g (0.84 mol) of sodium nitrite in 300 mL of water was added dropwise. The resulting mixture was stirred at 0° C. for 45 min; then a solution of 172 g (0.84 mol) of N,N-dibutylaniline in 200 mL of absolute ethanol was added. The mixture was neutralized with sodium acetate, then stirred at 23° C. overnight. The resulting red precipitate was collected by filtration, washed with water, and air-dried. The product was purified by recrystallization from isopropanol. Yield: 100 g (35%). $^1$H NMR (CDCl$_3$) δ0.97 (t, 6H), 1.4 (m, 4H), 1.6 (m, 4H), 3.38 (t, 4H), 6.72 (d, 2H), 7.9 (m, 6H), 10.06 (s, 1H).

B. 4-Dibutylamino-4'-($\beta$-cyano-$\beta$-perfluorobutylsulfonylvinyl) azobenzene (2). A mixture of 2.0 g (5.9 mmol) of 4-dibutylamino-azobenzene-4'-carboxaldehyde, 1.9 g (5.9 mmol) of perfluorobutylsulfonylacetonitrile (synthesized according to the procedure of Ogoiko et al., *J. Org. Chem. USSR (Engl. Trans.)* 1980, 1200-3), and 40 mL of isopropanol was stirred at 23° C. for 18 hr. The precipitate was collected, washed with cold methanol, dried and recrystallized from a large volume of heptane to give 2.4 g (63%) of (2). $^1$H NMR ((CDCl$_3$) δ0.95 (t, 6H), 1.35 (m, 4H), 1.6 (m, 4H), 3.37 (t, 4H), 6.68 (d, 2H), 7.86 (d, 2H), 7.92 (d, 2H), 8.14 (d, 2H), 8.19 (s, 1H). Field desorption mass spectroscopy (FD-MS): m/e 642 (M+).

EXAMPLE 3

Preparation of 1-Butyl-1,2,3,4-tetrahydro-6-[(4-($\beta$-cyano-$\beta$-perfluorobutylsulfonyl)vinylphenylazo]quinoline (3).

A. 1-Butyl-1,2,3,4-tetrahydroquinoline. A mixture of 25 g (0.188 mol) of 1,2,3,4-tetrahydroquinoline, 25.7 g (0.188 mol) of n-butyl bromide, 25.9 g (0.188 mol) of potassium carbonate, and 3.1 g (0.019 mol) of potassium iodide in 150 mL of acetonitrile was stirred mechanically at reflux under nitrogen for 44 hr. The reaction mixture was filtered, and the solvent removed by rotary evaporation. The residue was fractionally distilled at reduced pressure from CaH$_2$ to provide 14.6 g (41%) of a colorless oil, bp 92°-95° C. (0.04 mm). $^1$H NMR (CDCl$_3$) δ0.95 (t, 3H), 1.37 (m, 2H), 1.57 (m, 2H), 1.95 (m, 2H), 2.75 (t, 2H), 3.25 (m, 4H), 6.55 (m, 2H), 6.92 (d, 1H), 7.04 (d, 1H). MS 189 m/e (M+).

B. 1-Butyl-1,2,3,4-tetrahydro-6-[4(4-carboxyphenyl)azo]-quinoline. A suspension of 10 g (83 mmol) of 4-aminobenzaldehyde in 100 mL of 20% aqueous hydrochloric acid was stirred for 17 hr, then cooled to 0° C. A solution of 5.9 g (85 mmol) of sodium nitrite in 20 mL of water was added dropwise, with stirring, over 1 hr; the resulting mixture was stirred for 1.5 hr longer. 1-Butyl-1,2,3,4-tetrahydroquinoline (12 g, 63 mmol) was added; the reaction mixture was neutralized with sodium acetate, and stirring was continued for 2 hr. The product was extracted into dichloromethine. Upon removal of the solvent, there remained 3.0 g (15%) of a red oil.

C. 1-Butyl-1,2,3,4-tetrahydro-6-[(4-$\beta$-cyano-$\beta$-perfluorobutylsulfonyl)vinylphenyl)-azo]quinoline (3). A mixture of 0.61 g (1.9 mmol) of 1-butyl-1,2,3,4-tetrahydro-6-[(4-carboxyphenyl)azo]quinoline, 0.61 g (1.9 mmol) of perfluorobutylsulfonylacetonitrile, and 15 mL of anhydrous isopropanol was stirred for 18 hr at 23° C. The solid that precipitated was collected and twice recrystallized from toluene/heptane to produce (3) as a purple solid. Yield: 0.59 g (50%). $^1$H NMR (CDCl$_3$) δ0.99 (t, 3H), 1.4 (m, 2H), 1.65 (m, 2H), 2.0 (m, 2H), 2.84 (t, 2H), 3.40 (t, 2H), 3.45 (t, 2H), 6.65 (d, 1H), 7.66 (s, 1H), 7.76 (d, 1H), 7.95 (d, 2H), 8.16 (d, 2H), 8.21 (s, 1H). FD-Ms 626 m/e (M+).

EXAMPLE 4

Comparison of Figure of Merit of (2) and (3) with Prior Art

The figure of merit $\mu \bullet \beta$, the product of the ground state dipole moment and the molecular hyperpolarizability, was measured at 1900 nm for compounds (2) and (3) by the procedure described in A. Ulman et al., *J. Am. Chem Soc.*, 1990, (112) page 7083, and compared with that of two analogous compounds whose geminal substituents are dicyano and cyano, nitro, respectively. The following results were obtained:

| Compound Substitution | $\mu.\beta$ ($\times 10^{-48}$ esu) |
| --- | --- |
| $\beta$,$\beta$-dicyanovinyl | 2800 |
| $\beta$-cyano-$\beta$-nitro | 4600 |
| (2) $\beta$-cyano-$\beta$-perfluorobutylsulfonyl | 5900 |
| (3) $\beta$-cyano-$\beta$-perfluorobutylsulfonyl | 5200 |

The above data illustrate the much superior figure of merit observed for compounds (2) and (3) in accordance with the invention, compared with analogous compounds of the prior art.

The invention has been described in detail with particular reference to preferred embodiments thereof, but it will be understood that variations and modifications can be effected within the spirit and scope of the invention.

| PARTS LIST | |
|---|---|
| 100 | optical article |
| 101 | electromagnetic radiation |
| 103 | prism |
| 105 | optically active transmission medium |
| 107 | prism |
| 109 | cladding element |
| 111 | cladding element |
| 113 | electromagnetic radiation |
| 115 | radiation filter |
| 117 | electromagnetic radiation |
| 200 | optical article |
| 201 | electromagnetic radiation |
| 203 | electromagnetic radiation input means |
| 205 | optically active transmission medium |
| 207 | upper electrode |
| 209 | lower electrode |
| 211 | electrical conductor |
| 213 | electrical conductor |
| 215 | electronic response unit |
| 300 | optical article |
| 301 | electromagnetic radiation |
| 305 | optically active transmission medium |
| 307 | upper electrode |
| 309 | lower electrode |
| 311 | prism |
| 313 | electromagnetic radiation |
| 315a | radiation path |
| 315b | radiation path |
| 319a | sensing unit |
| 319b | sensing unit |
| 325 | DC potential source |
| 327 | electrical conductor |
| 329 | electrical conductor |
| 400 | optical article |
| 401 | reflective substrate |
| 403 | optically active transmission medium |
| 405 | electromagnetic radiation source |
| 407 | electromagnetic radiation |
| 409 | electromagnetic radiation |
| 411 | sensor |
| 500 | optical article |
| 501 | electromagnetic radiation |
| 503 | waveguide |
| 505 | optically active transmission medium |
| 507 | cladding layer |
| 509 | prism |
| 511 | electromagnetic radiation |
| 600 | optical device |
| 601 | substrate |
| 603 | waveguide |
| 605 | waveguide |
| 607 | waveguide |
| 609 | waveguide |
| 611 | electromagnetic radiation |
| 613 | prism |
| 615 | prism |
| 617 | electromagnetic radiation |

What is claimed is:

1. An optical article containing for the transmission of electromagnetic radiation a medium that exhibits a second order polarization susceptibility greater than $10^{-9}$ electrostatic units and comprises a polymer containing within its repeating units polar aligned noncentrosymmetric molecular dipoles having an electron donor moiety linked through a conjugated $\pi$ bonding system to an electron acceptor moiety to permit oscillation of the molecular dipoles between a ground state exhibiting a first dipole moment and an excited state exhibiting a different dipole moment, characterized in that the molecular dipoles include as an electron acceptor moiety a vinyl group geminally substituted by two strong electron withdrawing groups, at least one of which is a perfluoroalkylsulfonyl moiety.

2. An optical article according to claim 1 further characterized in that the molecular dipoles include the electron donor moiety linked to the electron acceptor moiety through a conjugated $\pi$ bonding system consisting of two terminal carbocyclic aromatic rings linked through 1 to 3 vinyl groups or two aza groups.

3. An optical article according to claim 2 further characterized in that the molecular dipoles are represented by the formula:

$$\boxed{A-E-D} \longleftrightarrow \boxed{\overset{-}{A}=E=\overset{+}{D}}$$
$$\;\;\;\;\;|\;\;\;\;\;\;\;\;\;\;\;\;\;\;\;\;\;\;\;\;\;\;\;|$$
$$-L_x\;\;\;\;\;\;\;\;\;\;\;\;\;\;-L_x$$

where

A is an electron acceptor moiety,

D is an electron donor moiety,

E is a conjugated $\pi$ bonding system consisting of two terminal carbocyclic aromatic rings linked by 2 to 6 atoms that comprise vinylene, azomethine, or azo groups, L is a crosslinking connector moiety, and x is an integer from 1 to 4.

4. An optical article according to claim 3 further characterized in that D is a secondary or tertiary amino moiety.

5. An optical article according to claim 3 further characterized in that A is:

$$-C=C\begin{matrix}\diagup X \\ \diagdown \\ SO_2C_nF_{2n+1}\end{matrix}$$
$$\;\;\;|\\\;\;\;Y$$

where

X is a strong electron withdrawing group,

Y is hydrogen or a strong electron withdrawing group that is the same as or different from X, and n is an integer from 1 to about 10.

6. An optical article according to claim 3 further characterized in that the molecular dipoles are represented by the formula:

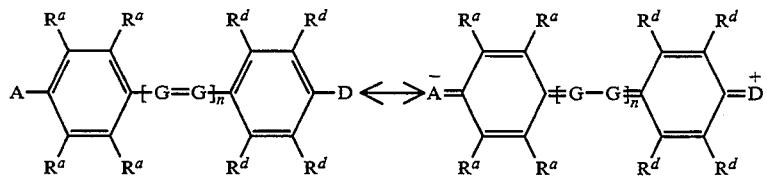

where

A is an electron acceptor moiety,

D is an electron donor moiety, $R^a$ represent hydrogen, substituents which, together with the electron acceptor moiety, collectively enhance electron acceptance of the phenyl ring to which they are attached or, optionally in one occurrence, a connector moiety L, R$^d$ represent hydrogen, substituents which, together with the electron donor amino moiety, collectively enhance the electron acceptance of the phenyl ring to which they are attached or, optionally in one occurrence, a connector moiety L, G is independently in each occurrence a methine or aza moiety, with the proviso that no more than two aza moieties are next adjacent, and n is an integer of from 1 to 3.

7. An optical article according to claim 5 further characterized in that X is selected from the group consisting of -COR, -COOR, -CN, -SO$_2$R, -SO$_2$C$_n$F$_{2n+1}$ and -NO$_2$, where R is an optionally substituted hydrocarbon moiety and n is an integer from 1 to about 10.

8. An optical article according to claim 7 further characterized in that X is -CN and Y is hydrogen.

9. An optical article according to claim 7 further characterized in that X is -SO$_2$C$_n$F$_{2n+1}$ and Y is hydrogen.

10. An optical article according to claim 1 wherein said polymer is a linear polymer that contains repeating units from vinyl addition polymerization, at least 5 percent of said repeating units incorporating said molecular dipoles as pendant groups.

11. An optical article according to claim 10 further characterized in that the linear polymer is a homopolymer.

12. An optical article according to claim 10 further characterized in that the repeating units incorporating the molecular dipoles form from 5 to 35 percent of the repeating units of the linear polymer.

13. An optical article according to claim 10 further characterized in that the linear polymer exhibits a molecular weight in the range of from 10,000 to 200,000 on a weight average basis.

14. An optical article according to claim 13 further characterized in that the linear polymer exhibits a molecular weight in the range of from 15,000 to 120,000 on a weight average basis.

15. An optical article according to claim 1 wherein said molecular dipole repeating units are included in a crosslinked polymeric matrix.

16. An optical article according to claim 15 wherein said molecular dipole repeating units are crosslinked by

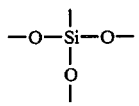

crosslinking moieties.

17. An optical article according to claim 15 wherein said molecular dipole repeating units are crosslinked by acryloyloxy or methacryloyloxy moieties.

18. An optical article according to claim 1 further characterized in that the linear polymer contains repeating units derived from the vinyl addition polymerization of 2-alkenoate esters.

19. An optical article according to claim 18 further characterized in that the repeating units containing the molecular dipoles are represented by the formula:

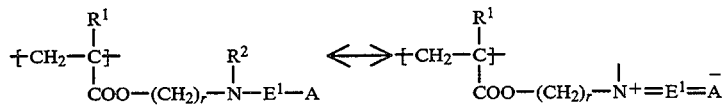

where

A is an electron acceptor moiety,

E$^1$ is a 4,4'-stilbenoid moiety, r is an integer of from 1 to 12,

R$^1$ is hydrogen or methyl, and

R$^2$ is hydrogen or a hydrocarbon containing from 1 to 6 carbon atoms.

20. An optical article according to claim 19 further characterized in that remaining repeating units of the linear polymer are represented by the formula:

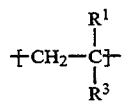

where

R$^1$ is hydrogen or methyl,

R$^3$ is -CN or -COOR$^4$, and

R$^4$ is alkyl of from 1 to 6 carbon atoms.

21. An optical article according to claim 1 wherein said polymer is a linear condensation polymer that includes in its backbone a plurality of said molecular dipoles which are oriented to reinforce electron displacement along the polymer backbone.

22. An optical article according to claim 21 wherein said linear condensation polymer is a polyester.

23. An optical article according to claim 1 further characterized in that biasing means are provided for placing an electric field across said medium.

24. An optical article according to claim 23 further characterized in that said biasing means includes at least one transparent electrode in contact with said medium.

25. An optical article according to claim 1 further characterized in that means are provided for directing electromagnetic radiation to said medium.

26. An optical article according to claim 1 further characterized in that said medium lies in contact with a linear waveguide for electromagnetic radiation.

27. An optical article according to claim 1 further characterized in that said medium exhibits a $\chi^{(2)}$ of at least 10$^{-8}$ electrostatic units.

* * * * *